United States Patent
Santosuosso et al.

(10) Patent No.: US 8,560,527 B2
(45) Date of Patent: Oct. 15, 2013

(54) MANAGEMENT SYSTEM FOR PROCESSING STREAMING DATA

(71) Applicant: International Business Machines Corporation, Armonk, NY (US)

(72) Inventors: John M. Santosuosso, Rochester, MN (US); Brandon W. Schulz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/681,769

(22) Filed: Nov. 20, 2012

(65) Prior Publication Data

US 2013/0080600 A1    Mar. 28, 2013

Related U.S. Application Data

(63) Continuation of application No. 13/190,810, filed on Jul. 26, 2011.

(51) Int. Cl.
  *G06F 7/00* (2006.01)
  *G06F 17/30* (2006.01)

(52) U.S. Cl.
  USPC .......................................... 707/720

(58) Field of Classification Search
  USPC ................................. 707/716, 720
  See application file for complete search history.

(56) References Cited

U.S. PATENT DOCUMENTS

| | | | |
|---|---|---|---|
| 7,529,752 B2 | 5/2009 | Hinshaw et al. | |
| 7,577,667 B2 | 8/2009 | Hinshaw et al. | |
| 7,834,875 B2 | 11/2010 | Liu et al. | |
| 7,860,009 B2 | 12/2010 | Pike et al. | |
| 2004/0052212 A1 | 3/2004 | Baillargeon | |
| 2006/0004935 A1 | 1/2006 | Seto et al. | |
| 2006/0064438 A1 | 3/2006 | Aggarwal | |
| 2006/0218123 A1 | 9/2006 | Chowdhuri et al. | |
| 2007/0299980 A1 | 12/2007 | Amini et al. | |
| 2008/0005392 A1 | 1/2008 | Amini et al. | |
| 2009/0003600 A1 | 1/2009 | Chen et al. | |
| 2009/0178043 A1 | 7/2009 | Prasanna et al. | |

(Continued)

FOREIGN PATENT DOCUMENTS

| | | |
|---|---|---|
| JP | 10097437 A | 4/1998 |
| JP | 2001325041 A | 11/2001 |
| WO | 2010020577 A1 | 2/2010 |

OTHER PUBLICATIONS

U.S. Appl. No. 13/190,810, entitled Management System for Processing Streaming Data, filed Jul. 26, 2011.

(Continued)

*Primary Examiner* — Fred I Ehichioya
*Assistant Examiner* — Kris Mackes
(74) *Attorney, Agent, or Firm* — Patterson & Sheridan LLP

(57) ABSTRACT

Techniques are disclosed for evaluating tuples for processing by a stream application having a plurality of process elements. In one embodiment, at least one tuple to be processed by at least one processing element of the stream application is identified. A maximum duration for which the at least one processing element is allowed to process the at least one tuple is determined. A duration for which the at least one processing element is likely to process the at least one tuple is also estimated. Processing of the at least one tuple is managed based on a comparison between the maximum duration and the estimated duration.

20 Claims, 8 Drawing Sheets

(56) References Cited

U.S. PATENT DOCUMENTS

| | | | |
|---|---|---|---|
| 2009/0254774 A1 | 10/2009 | Chamdani et al. | |
| 2009/0313400 A1* | 12/2009 | Amini et al. | 710/29 |
| 2009/0313614 A1 | 12/2009 | Andrade et al. | |
| 2010/0030896 A1* | 2/2010 | Chandramouli et al. | 709/224 |
| 2010/0106946 A1* | 4/2010 | Imaki et al. | 712/220 |
| 2010/0229178 A1* | 9/2010 | Ito | 718/104 |
| 2013/0080652 A1 | 3/2013 | Cradick et al. | |
| 2013/0080653 A1 | 3/2013 | Santosuosso et al. | |
| 2013/0081042 A1 | 3/2013 | Branson et al. | |

OTHER PUBLICATIONS

U.S. Appl. No. 13/190,694, entitled Dynamic Reduction of Stream Back Pressure, filed Jul. 26, 2011.
U.S. Appl. No. 13/190,717, entitled Using Predictive Determinism Within a Streaming Environment, filed Jul. 26, 2011.
U.S. Appl. No. 13/190,757, entitled Dynamic Runtime Choosing of Processing Communication Methods, filed Jul. 26, 2011.
U.S. Appl. No. 13/682,008 entitled "Dynamic Reduction of Stream Backpressure", filed Nov. 20, 2012.
U.S. Appl. No. 13/681,919 entitled "Using Predictive Determinism Within a Streaming Environment", filed Nov. 20, 2012.
U.S. Appl. No. 13/681,820 entitled "Dynamic Runtime Choosing of Processing Communication Methods", filed Nov. 20, 2012.
U.S. Appl. No. 13/361,287 entitled "Processing Element Management in a Streaming Data System", filed Jan. 30, 2012.
U.S. Appl. No. 13/709,405 entitled "Processing Element Management in a Streaming Data System", filed Dec. 10, 2012.
U.S. Appl. No. 13/456,600 entitled "Operator Graph Changes in Response to Dynamic Connections in Stream Computing Applications", filed Apr. 26, 2012.
U.S. Appl. No. 13/675,872 entitled "Streams Optional Execution Paths Depending Upon Data Rates", filed Nov. 13, 2012.
U.S. Appl. No. 13/706,115 entitled "Streams Optional Execution Paths Depending Upon Data Rates", filed Dec. 5. 2012.
International Search Report and Written Opinion of the ISA dated Dec. 20, 2012—International Application No. PCT/IB2012/053790.
International Search Report and Written Opinion of the ISA dated May 14, 2013—International Application No. PCT/IB2013/050228.
U.S. Appl. No. 13/706,115, entitled Streams Optional Execution Paths Depending Upon Data Rates, filed Dec. 5, 2012.
U.S. Appl. No. 13/675,872, entitled Streams Optional Execution Paths Depending Upon Data Rates, filed Nov. 13, 2012.
U.S. Appl. No. 13/709,405, entitled Processing Element Management in a Streaming Data System, filed Dec. 10, 2012.
U.S. Appl. No. 13/361,287, entitled Processing Element Management in a Streaming Data System, filed Jan. 30, 2012.
U.S. Appl. No. 13/780,800, entitled Operator Graph Changes in Response to Dynamic Connections in Stream Computer Applications, filed Feb. 28, 2013.
U.S. Appl. No. 13/456,600, entitled Operator Graph Changes in Response to Dynamic Connections in Stream Computer Applications, filed Apr. 26, 2012.

* cited by examiner

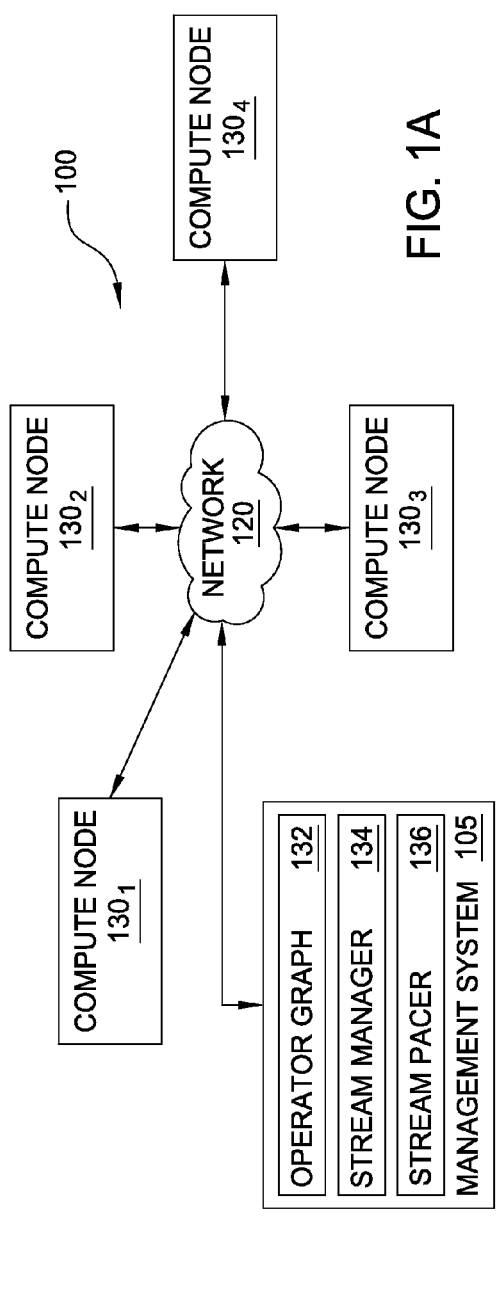
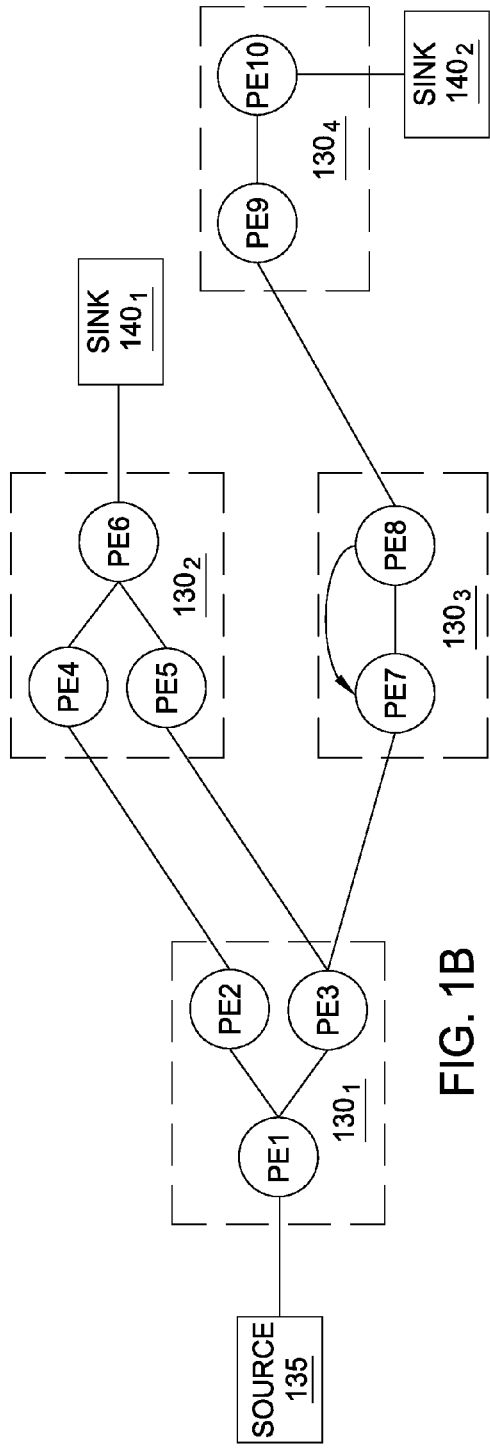

MANAGEMENT SYSTEM FOR PROCESSING STREAMING DATA

CROSS-REFERENCE TO RELATED APPLICATIONS

This application is a continuation of co-pending U.S. patent application Ser. No. 13/190,810, filed Jul. 26, 2011. The aforementioned related patent application is herein incorporated by reference in its entirety.

BACKGROUND

Databases are computerized information storage and retrieval systems. A relational database management system is a computer database management system (DBMS) that uses relational techniques for storing and retrieving data. An object-oriented programming database is a database that is congruent with the data defined in object classes and subclasses.

Regardless of the particular architecture, a requesting entity (e.g., an application or the operating system) in a DBMS requests access to a specified database by issuing a database access request. Such requests may include, for instance, simple catalog lookup requests or transactions and combinations of transactions that operate to read, change and add specified records in the database. These requests are often made using high-level query languages such as Structured Query Language (SQL). Upon receiving such a request, the DBMS may execute the request against a corresponding database, and return any result of the execution to the requesting entity.

SUMMARY

Embodiments of the invention provide a method, system and computer program product for performing an operation that includes receiving streaming data to be processed by a stream application comprising a plurality of processing elements. Each processing element includes one or more operators that are contained within a single process. The streaming data includes a plurality of tuples. The operation also includes identifying at least one tuple to be processed by at least one processing element of the stream application. The operation also includes determining a maximum duration for which the at least one processing element is allowed to process the at least one tuple. The operation also includes determining an estimated duration for which the at least one processing element is likely to process the at least one tuple. The operation also includes managing processing of the at least one tuple, based on a comparison between the maximum duration and the estimated duration.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 1A-1B illustrate a computing infrastructure 100 configured to execute a stream application, according to one embodiment of the invention.

DETAILED DESCRIPTION

Figure 2:
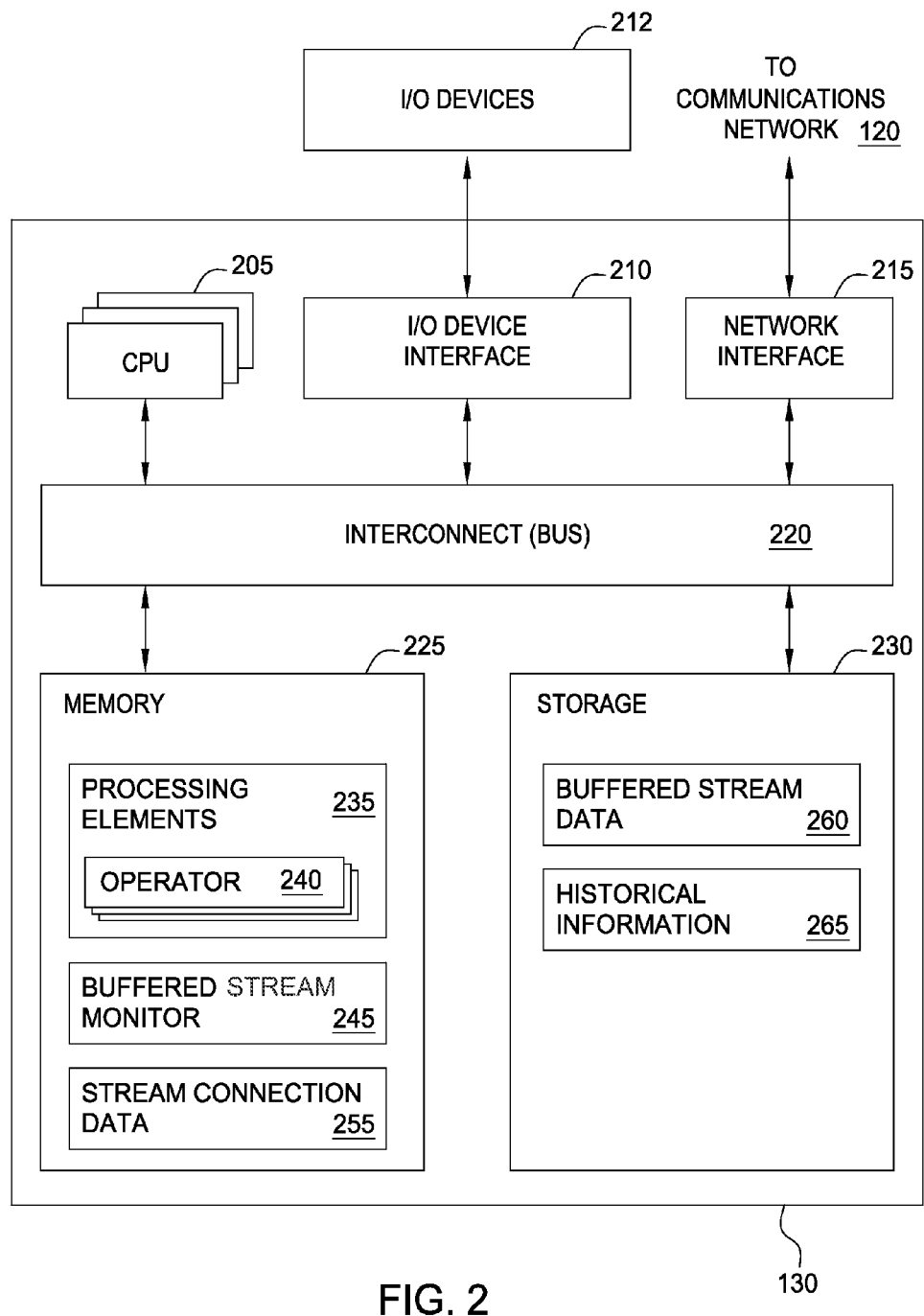
FIG. 2 is a more detailed view of the compute node 130 of FIGS. 1A-1B, according to one embodiment of the invention.

Stream-based computing and stream-based database computing are emerging as a developing technology for database systems. With this emerging technology, users can create applications that process and query streaming data before it reaches a database file. Further, users can specify processing logic to apply to inbound data records while they are "in flight," with the results available in a very short amount of time, often in milliseconds. Constructing an application using this type of processing has opened up a new programming paradigm that will allow for a broad variety of innovative applications, systems and processes to be developed, as well as present new challenges for application programmers and database developers.

In a stream application, data may be continuously read and passed from one processing element to another. A processing element refers to a collection of operators that are contained within a single process. An operator refers to an executable piece of code that is connected to other operators, such that data flows from one processing element to the next (e.g., over a TCP/IP socket). Scalability is reached by distributing an application across nodes by creating many small executable pieces of code (i.e., the operators), as well as replicating processing elements on multiple nodes and load balancing among them. Processing elements (and operators) in a stream application can be fused together to form a larger processing element. Doing so allows processing elements to share a common process space, resulting in much faster communication between operators than is available using inter-process communication techniques (e.g., using a TCP/IP socket). Further, processing elements can be inserted or removed dynamically from an operator graph representing the flow of data through the stream application, as well as fused or un-fused from a stream application during runtime. The operator graph may be used to divide and/or distribute a workload across the processing elements, so that data may be processed with increased parallelism.

One advantage of stream applications is that they allow the user to granularly control the process flow of data through the application. In other words, the user may designate specific operators for each processing element that perform various operations on the incoming data, and may dynamically alter the stream application by modifying the operators and the order in which they are performed. Additionally, stream applications are able to handle large volumes of data while limiting any "bottlenecks" in the processing. Further, stream applications may meet the performance requirements of some real-time applications, where database systems do not. Database systems are typically configured to separate the process of storing data from accessing, manipulating or using data stored in the database. More specifically, databases use a model where data is first stored, then indexed, and finally queried. Accordingly, the rate at which a database system can receive and store incoming data limits how much data can be processed or otherwise evaluated. Advantageously, at least in some cases, the ability of stream applications to process large amounts of data in real-time is not necessarily as limited as compared to database applications.

Embodiments of the invention provide techniques for managing processing of streaming data. The streaming data may include N-tuples of data attributes. One embodiment provides a stream pacer configured to receive a tuple to be processed by a first processing element. The stream pacer determines a maximum duration for which the first processing element is allowed to process the tuple. The maximum duration may be determined based on real-time indicators of workload experienced by the first processing element and/or the streaming application. One example of a real-time indicator is a buffer level for inbound tuples, which characterizes a degree to which the buffer is full from storing tuples that remain to be processed. The stored tuples may be received from one or more upstream processing elements. Additionally or alternatively, the maximum duration may be user-specified and tailored to suit the needs of a particular case and/or processing element. The stream pacer also determines an estimated duration, where the estimated duration refers to a duration for which the first processing element is likely to process the tuple. The estimated duration may be determined based on historical data collected from processing of previous tuples by the first processing element. Depending on the embodiment, the estimated duration may vary based on the processing element and/or one or more data attributes stored in a tuple.

In one embodiment, the stream pacer then manages processing of the tuple, based on a comparison between the maximum duration and the estimated duration. For example, if the estimated duration exceeds the maximum duration, the stream pacer may reject the tuple from being processed by the first processing element. The stream pacer may also send a message to a requesting entity, explaining that the tuple was denied for processing. In some embodiments, the stream pacer may repeat one or more of the above steps to determine whether to approve the tuple to be processed by a second processing element. On the other hand, if the estimated duration does not exceed the maximum duration, then the stream pacer may approve the tuple for processing by the first processing element. In some embodiments, the stream pacer may also halt the processing of a tuple that is already being processed, if the estimated time remaining for the processing of the tuple to complete exceeds the maximum duration. However, it may not always be desirable to halt the processing of tuples being processed. Accordingly, in one embodiment, a user may set a flag that specifies not to halt tuple processing under any circumstances. Thus, the behavior of the stream pacer in halting tuple processing may be overridden to suit the needs of a particular case.

Advantageously, the stream pacer may manage the processing of streaming data in a manner that is more responsive to the needs of the processing elements and/or users at least in some cases. For example, the stream pacer may impose a maximum duration for tuple processing, which may reduce a likelihood of a given processing element being overwhelmed from processing an enduring tuple. Accordingly, the number of wait conditions created for downstream processing elements may be reduced. In some embodiments, the maximum duration may be specific to a given processing element and/or data attribute stored in a tuple.

Further, in some scenarios, such as in stock trading and surveillance work, data may have no value if not processed within an associated maximum timeframe that is user-specified. Accordingly, the stream pacer may reject a tuple from being processed if the stream pacer estimates that the tuple is not likely to be processed within the maximum timeframe. In addition, the stream pacer may allow fewer tuples to be processed by a given processing element, when the processing element is experiencing a heavy workload. On the other hand, the stream pacer may allow more tuples to be processed by the given processing element, when the processing element is experiencing a light workload.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present invention, a user may access applications or related data available in the cloud. For example, the nodes used to create a stream application may be virtual machines hosted by a cloud service provider. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIGS. 1A-1B illustrate a computing infrastructure configured to execute a stream application, according to one embodiment of the invention. As shown, the computing infrastructure 100 includes a management system 105 and a plurality of compute nodes $130_{1-4}$, each connected to a communications network 120. Also, the management system 105 includes an operator graph 132, a stream manager 134, and a stream pacer 136. As described in greater detail below, the operator graph 132 represents a stream application beginning from one or more source processing elements (PEs) through to one or more sink PEs. This flow from source to sink is also generally referred to herein as an execution path. Generally, data attributes flow into a source PE of a stream application and are processed by that PE. Typically, processing elements receive an N-tuple of data attributes from the stream as well as emit an N-tuple of data attributes into the stream (except for a sink PE where the stream terminates). Of course, the N-tuple received by a processing element need not be the same N-tuple sent downstream. Additionally, the processing elements could be configured to receive or emit data in formats other than an N-tuple (e.g., the processing elements could exchange data marked up as XML documents). Furthermore, each processing element may be configured to carry out any form of data processing functions on the received tuple, including, for example, writing to database tables or performing other database operations such as data joins, splits, reads, etc., as well as performing other data analytic functions or operations.

In one embodiment, the stream manager 134 is configured to monitor a stream application running on the compute nodes $130_{1-4}$, as well as to change the structure of the operator graph 132. The stream manager 134 may move processing elements (PEs) from one compute node 130 to another, for example, to manage the processing loads of the compute nodes 130 in the computing infrastructure 100. Further, stream manager 134 may control the stream application by inserting, removing, fusing, un-fusing, or otherwise modifying the processing elements (or what data-tuples flow to the processing elements) running on the compute nodes $130_{1-4}$.

In one embodiment, the stream pacer 136 is configured to manage processing of a data stream. More specifically, the stream pacer 136 may evaluate a tuple to determine whether to approve (or reject) the tuple for execution by a given processing element. The determination may be made based on a comparison between a maximum duration and an estimated duration for the tuple and/or processing element. At least in some embodiments, some or all of the functionality of the stream pacer 136 may be performed by the stream manager 134. For example, the stream pacer 136 may be implemented as a stream pacer component of the stream manager 134.

In one embodiment of the invention, the management system 105 may maintain multiple operator graphs 132. In such an embodiment, one operator graph 132 is designated as the operator graph, which represents the general or default processing flow, while the other operator graphs may represent alternate processing flows.

FIG. 1B illustrates an example operator graph that includes ten processing elements (labeled as PE1-PE10) running on the compute nodes $130_{1-4}$. While a processing element may be executed as an independently running process with its own process ID (PID) and memory space, multiple processing elements may also be fused to run as single process (with a PID and memory space). In cases where two (or more) processing elements are running independently, inter-process communication may occur using a network socket (e.g., a TCP/IP socket). However, when processes are fused together, the fused processing elements can use more rapid communication techniques for passing N-tuples (or other data) among processing elements (and operators in each processing element).

As shown, the operator graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into the processing element PE1, which in turn emits tuples that are received by PE2 and PE3. For example, PE1 may split data attributes received in a tuple and pass some data attributes to PE2, while passing other data attributes to PE3. Data that flows to PE2 is processed by the operators contained in PE2, and the resulting tuples are then emitted to PE4 on compute node $130_2$. Likewise, the data tuples emitted by PE4 flow to sink PE6 $140_1$. Similarly, data tuples flowing from PE3 to PE5 also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which in turn emits tuples to be processed by sink PE10 $140_2$.

Furthermore, although embodiments of the present invention are described within the context of a stream application, this is not the only context relevant to the present disclosure. Instead, such a description is without limitation and is for illustrative purposes only. One of ordinary skill in the art will recognize that embodiments of the present invention may be configured to operate with any computer system or application capable of performing the functions described herein. For example, embodiments of the invention may be configured to operate in a clustered environment with a standard database processing application. More generally, the techniques disclosed herein may be applied to any environment that maintains one or more operator graphs of processing elements, including both streaming and non-streaming environments.

FIG. 2 is a more detailed view of the compute node 130 of FIGS. 1A-1B, according to one embodiment of the invention. As shown, the compute node 130 includes, without limitation, at least one central processing unit (CPU) 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, network interface 215, and memory 225. CPU 205 is included to be representative of a single CPU, multiple CPUs, a single CPU having multiple processing cores, and the like. The memory 225 is generally included to be representative of a random access memory. Storage 230, such as a hard disk drive, solid state device (SSD), or flash memory storage drive, may store non-volatile data.

In this example, the memory 225 includes a plurality of processing elements 235, buffered stream monitor 245 and stream connection data 255. Each PE 235 includes a collection of operators 240. As noted above, each operator 240 may provide a small chunk of executable code configured to process data flowing into a processing element (e.g., PE 235) and to emit data to other operators 240 in that PE and to other processing elements in the stream application. Such processing elements may be on the same compute node 130 or on other compute nodes accessible over the data communications network 120. The stream connection data 255 represents the connections between PEs on compute node 130 (e.g., a TCP/IP socket connection between two separate PEs 235), as well as connections to other compute nodes 130 with upstream and or downstream PEs in the stream application, also via TCP/IP sockets (or other inter-process data communication mechanisms).

As shown, storage 230 contains buffered stream data 260 and historical information 265. The buffered stream data 260 represents a storage space for data flowing into the compute node 130 from upstream processing elements (or from a data source for the stream application). For example, buffered stream data 260 may include data tuples waiting to be processed by one of the PEs 235. Buffered stream data 260 may also store the results of data processing performed by processing elements 235 that will be sent to downstream processing elements. For example, a PE 235 may have to store tuples intended for a downstream PE 245 if that PE 235 already has a full buffer. On the other hand, the historical information 265 is formulated after running a particular stream application several times. Historical information 265, for example, can be the average of the amount of data stored in the buffered stream data 260 during a series of executions of an application. In sum, the buffered stream data 260 is a real-time measurement while the historical information 265 is a predictor of how a PE 235 on a compute node 130 will process tuples based on prior stream applications—i.e., whether the PE 235 will create a bottleneck.

Associated with the buffered stream data 260 is the buffered stream monitor 245 which evaluates the amount of data stored in the buffer 260. Typically, if the buffered stream monitor 245 determines that the buffer is nearly full of received buffered stream data 260, this indicates that the processing element on that compute node 130 is running behind, thereby creating a bottleneck in the execution path. The buffered stream monitor 245 then reports this latency to the stream manager 134 found on the management system 105. Conversely, the buffered stream data 260 may be full because the buffer for downstream PE in the execution path is already full. In such a case, the buffer stream monitor 245 would not report that the PE 235 is creating a bottleneck.

Figure 3:
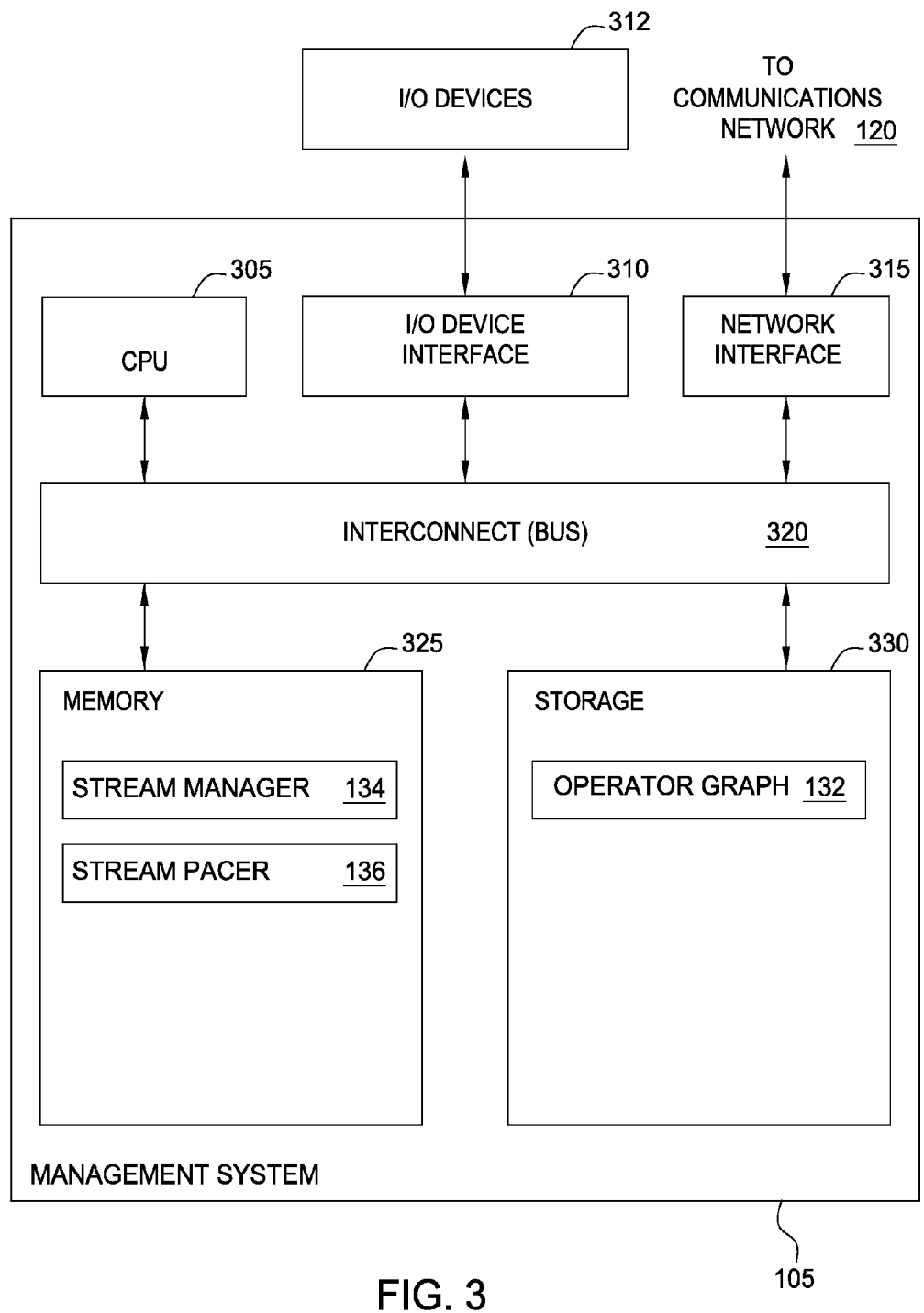
FIG. 3 is a more detailed view of the server computing system 105 of FIG. 1, according to one embodiment of the invention.

FIG. 3 is a more detailed view of the management system 105 of FIG. 1, according to one embodiment of the invention. As shown, the management system 105 includes, without limitation, a central processing unit (CPU) 305, a network interface 315, an interconnect 320, a memory 325, and storage 330. The client system 130 may also include an I/O device interface 310 connecting I/O devices 312 (e.g., keyboard, display and mouse devices) to the management system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores the stream manager 134 and the stream pacer 136. Additionally, the storage 330 includes the operator graph 132. The stream manager 134 may generally route tuples received as part of a data stream to PEs 235 to be processed, according to the operator graph 132. The stream pacer 136 evaluates each tuple to be processed by a given processing element and determines whether to approve the tuple for processing by the given processing element. The determination may be made based on whether the tuple is estimated to exceed a maximum processing duration. The estimated duration may be determined based on the historical information 265 and buffered stream monitor 245 located on each compute node 130. The maximum duration may be determined based on data received from the buffered stream monitor 245 located on each compute node 130. For example, if the buffered stream monitor 245 of the PE 235 reports to the stream pacer 136 that the buffer is nearly full of received N-tuples, then the stream pacer 136 may determine that a lower maximum duration is warranted. Alternatively, the maximum duration may be a user-specified value. Imposing a maximum duration for tuple processing may, at least in some cases, reduce a likelihood of a given processing element being overwhelmed from processing an enduring tuple, especially when the processing element is experiencing a heavy workload.

In one embodiment, because stream applications often deal with large volumes of data, the processing of which is spread over multiple processing elements across multiple compute nodes, this presents additional challenges for application programmers and database developers. One such challenge is identifying bottlenecks that arise because of wait conditions. In general, wait conditions are processing elements which receive data from two or more processing elements that directly precede the wait condition in the stream. As an example, a particular processing element may need data from two separate processing elements before performing a certain operation. If, however, one of the processing elements provides data to the particular processing element at a slower rate than the other processing element, the particular processing element is limited by the slowest processing element in the flow of data, creating a bottleneck that may decrease application throughput. At least in some cases, imposing a maximum duration for tuple processing using may reduce the number of wait conditions in the stream.

Figure 4:
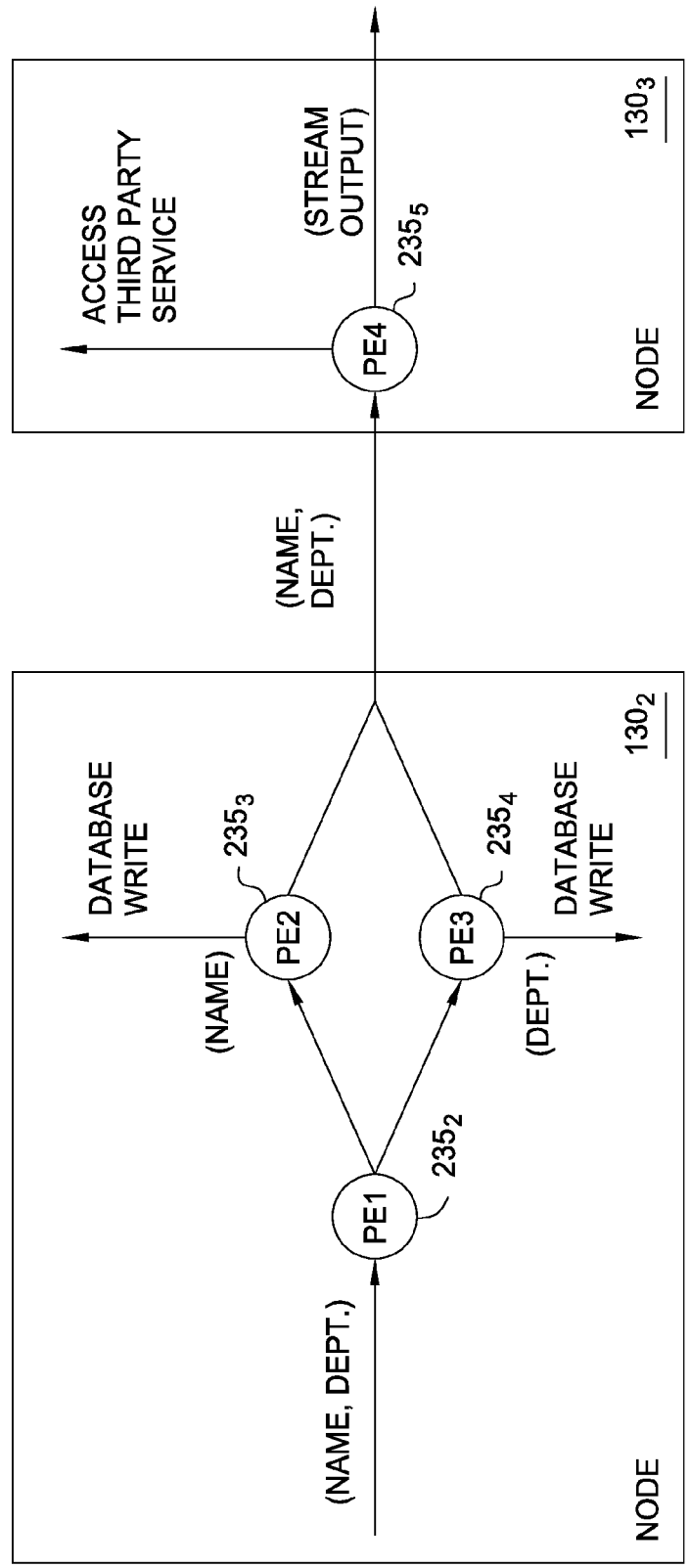
FIG. 4 illustrates an example of compute nodes in a stream application which create a wait condition, according to one embodiment of the invention.

FIG. 4 illustrates an example of compute nodes in a stream application that create a wait condition, according to one embodiment of the invention. As shown, compute node $130_2$ includes three processing elements $235_2$, $235_3$ and $235_4$ (labeled PE1-PE3) while compute node $130_3$ contains PE $235_5$ (PE4). In the depicted example, PE1 receives an N-tuple data stream and emits an N-tuple to PE2 and PE3 on compute node $130_2$. Processing elements PE2 and PE3, in turn, emit N-tuples to PE4 on compute node $130_3$. In this example, the PE1 receives a tuple which includes attributes <name, department>. PE1 takes this N-tuple, separates the attributes, and generates one set of tuples sent to PE2 (<name>) and another set of tuples sent to PE3 (<department>). In turn, PE2 and PE3 perform a database write for each tuple received from PE1 and send the tuple to PE4. Once received, PE4 concatenates the tuples back into the <name, department> format, accesses a third-party web service, and generates a tuple that is sent further downstream in the stream application.

Continuing the example, PE1 divided the tuple into a <name> tuple and a <department> tuple and sent each tuple to a different processing element 235 since both were written to separate databases. This example is a typical method implemented by a distributed system to increase throughput. However, PE4 cannot move onto the next tuple until it has received both the <name> tuple from PE2 and the <department> tuple from PE3. Thus, no matter how fast PE2 writes the tuple to the database and relays the tuple to PE4, PE4 cannot continue until PE3 sends the corresponding tuple. Thus, FIG. 4 exemplifies a wait condition.

Figure 5:
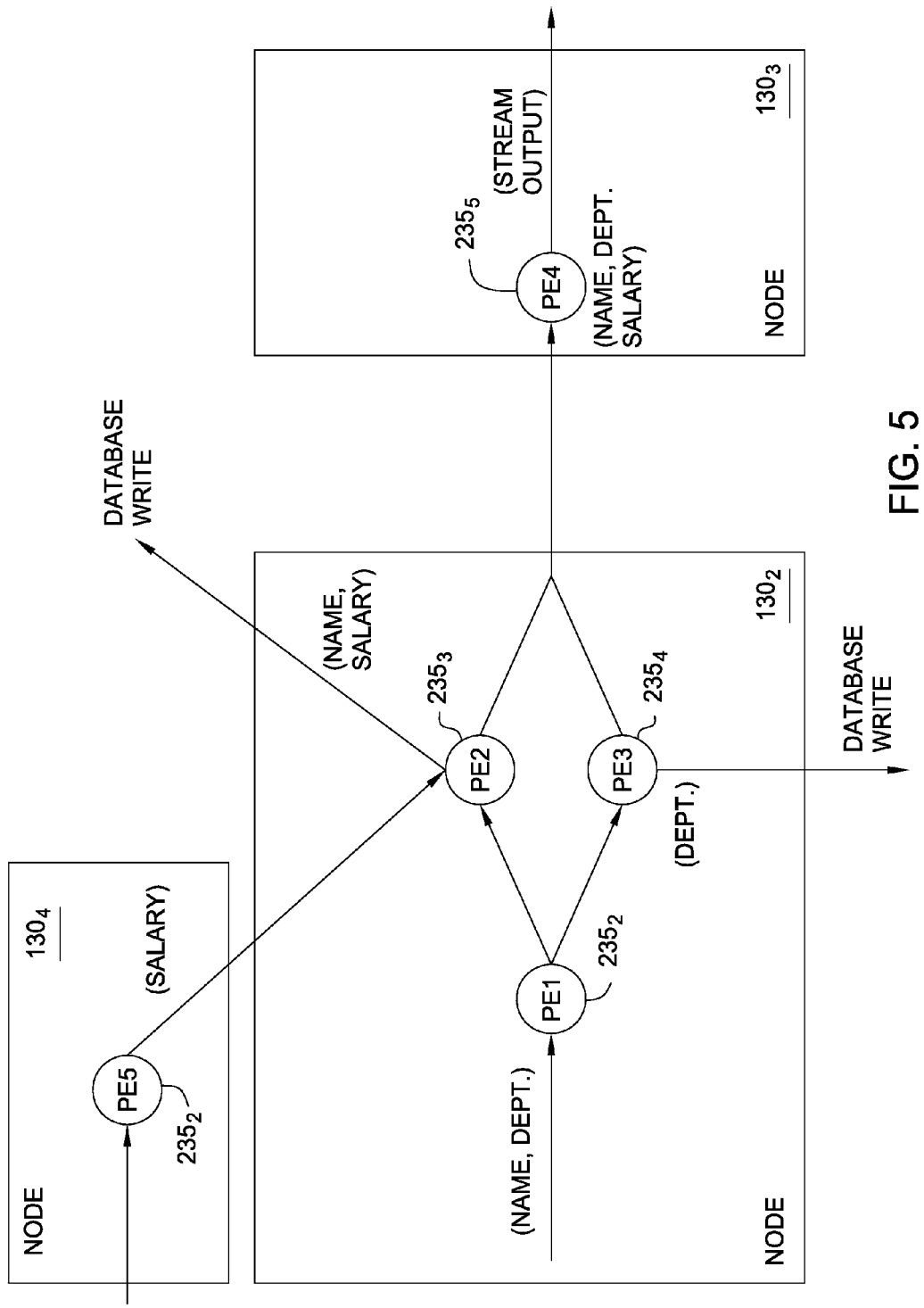
FIG. 5 illustrates an example of compute nodes in a stream application, according to one embodiment of the invention.

FIG. 5 illustrates an example of compute nodes in a stream application that creates a wait condition, according to one embodiment of the invention. As shown, compute node $130_2$ includes three processing elements $235_2$, $235_3$ and $235_4$ (labeled PE1-PE3). In the depicted example, processing element $235_2$ receives an N-tuple data stream and emits an N-tuple to processing elements $235_3$ and $235_4$ (labeled PE2 and PE3, respectively) on compute node $130_3$. Further, compute node $130_4$ includes processing element $235_6$ (PE5) which emits an N-tuple to PE2 with the attribute of <salary>. Processing elements PE2 and PE3, in turn, emit N-tuples to processing element $235_5$ (PE4) on compute node $130_3$. In this example, PE $235_2$ (labeled PE1), receives a tuple which includes attributes <name, department>. PE1 takes this N-tuple, separates the N-tuple, and generates one set of tuples sent to PE2 (<name>) and another set of tuples sent to PE3 (<department>). PE2 then concatenates the tuple received by PE5 and PE1. In turn, PE2 and PE3 perform a database write for each received tuple and send the tuple to PE4. Once received, PE4 concatenates the tuples into the <name, department, salary> format and generates a tuple that is sent further downstream in the stream application.

In this example, PE4 remains a wait condition as shown previously in FIG. 4; however, PE2 is now another wait condition. In one embodiment, PE2 is slower than PE3 since it must write into a database both the name and salary attributes. Thus, the wait condition found at PE4 could be abated by speeding up the execution of PE2—i.e., overclocking the processor associated with the compute node $130_2$. In another example, however, assume that PE2 can perform its database write as quickly as PE3, but PE5 sends a tuple to PE2 at half the rate of PE1. In that case, PE5 would slow down PE2, and thus, PE4. Overclocking PE2 would not alleviate the wait condition at PE4; however, speeding up the execution of PE5 would. This example illustrates that a processing element that needs to be sped up does not necessarily have to be located immediately prior to a wait condition.

In another embodiment, the stream manager 134 identifies a hierarchy of wait conditions, e.g., PE4 is the parent and PE2 is the child. Thus, the stream manager 134 would start at the wait condition closest to the end (PE4) and evaluate the prior PEs 235. If none of these were executing slowly, then the stream manager 134 would move to the next wait condition (PE2). Continuing the example above, the stream manager 134 may then determine that PE5 is creating the bottleneck and act accordingly.

Figure 6A:
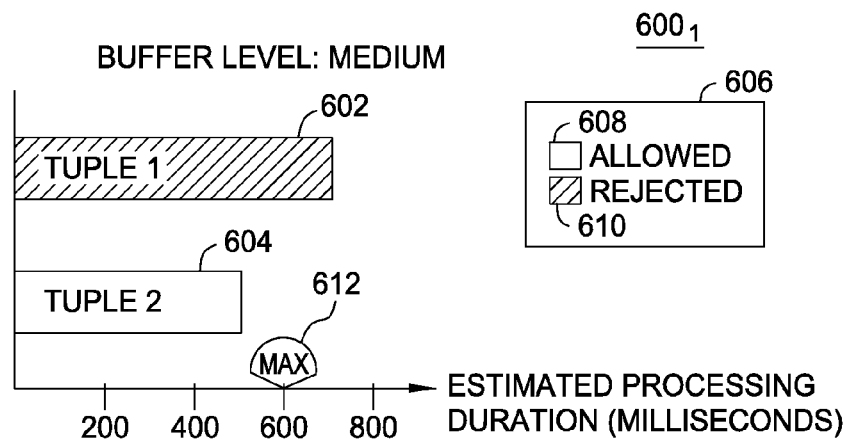
FIGS. 6A-6C are bar graphs depicting estimated processing durations of tuples, according to one embodiment of the invention.
Figure 6B:
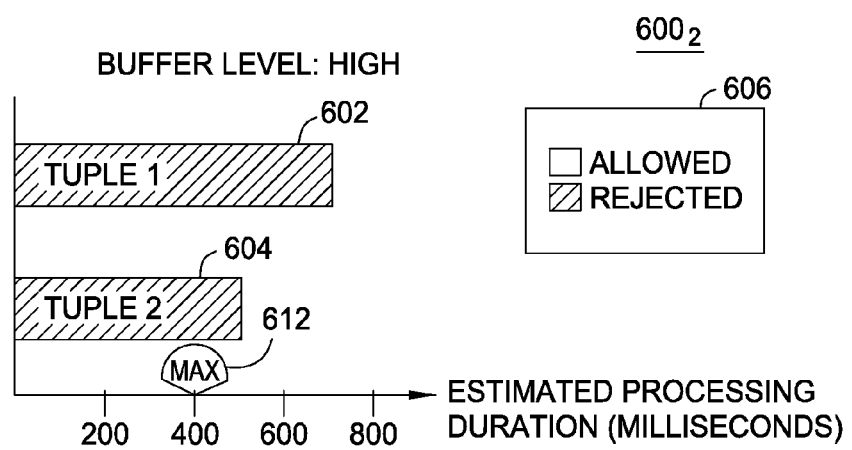
Figure 6C:
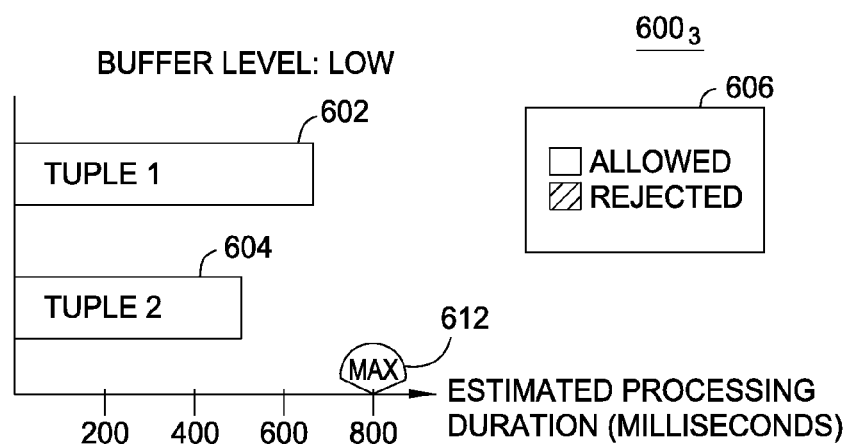

FIGS. 6A-6C are bar graphs $600_{1-3}$ depicting estimated processing durations of tuples, according to one embodiment of the invention. Assume that the stream pacer 136 determines an estimated processing duration of seven hundred milliseconds for a first tuple and five hundred milliseconds for a second tuple, respectively. Assume that the estimated processing durations pertain to a given processing element 235 in the stream application. As shown in FIG. 6A, the bar graph $600_1$ includes a first bar 602 representing the estimated processing duration for the first tuple and a second bar 604 representing the estimated processing duration for the second tuple.

Suppose that the stream pacer 136 identifies that the given processing element 235 has a medium buffer level. Suppose also that the stream pacer 136 determines, based on the medium buffer level, that the maximum allowed processing duration should be six hundred milliseconds. The maximum allowed processing duration is represented as a marker 612 in the bar graphs $600_{1-3}$. Accordingly, the stream pacer 136 rejects the first tuple from being executed, because the estimated processing duration of seven hundred milliseconds exceeds the maximum allowed processing duration. On the other hand, the stream pacer 136 allows the second tuple to execute, because the estimated processing duration of five hundred milliseconds does not exceed the maximum allowed processing duration. The bar graphs $600_{1-3}$ include a legend 606 indicating that a solid bar 608 represents an allowed tuple and a shaded bar 610 represents a rejected tuple.

Referring now to FIG. 6B, suppose that the processing element 235 has a high buffer level instead of a medium buffer level. In one embodiment, the stream pacer 136 determines, based on the high buffer level, that the maximum allowed processing duration should be four hundred milliseconds instead of six hundred milliseconds. The maximum allowed processing duration of four hundred milliseconds is represented by the marker 612 in FIG. 6B. Because the estimated processing durations of the tuples—which are seven hundred and five hundred milliseconds, respectively—exceed the maximum allowed processing duration of four hundred milliseconds, the stream pacer 136 rejects both tuples from being processed. Accordingly, lowering the maximum allowed processing duration during times of high system load of a processing element (e.g., as may be inferred from a high buffer level) may prevent the processing element from being overwhelmed at least in some cases.

Referring now to FIG. 6C, suppose that the processing element 235 has a low buffer level instead of a medium buffer level. In one embodiment, the stream pacer 136 determines, based on the low buffer level, that the maximum allowed processing duration should be eight hundred milliseconds instead of six hundred milliseconds. The maximum allowed processing duration of eight hundred milliseconds is represented by the marker 612 in FIG. 6C. Because the estimated processing durations of the tuples do not exceed the maximum allowed processing duration of eight hundred milliseconds, the stream pacer 136 allows both tuples to be processed.

Accordingly, increasing the maximum allowed processing duration during times of low system load (e.g., as may be inferred from a low buffer level) may prevent the processing element 235 from being underutilized at least in some cases. In some embodiments, such as during times of very low system load, the stream pacer 136 may allow all tuples to processed, regardless of estimated processing durations. For instance, the maximum allowed processing duration may be set to a predefined value representing infinity. Additionally or alternatively, some or all of the functionality of the stream pacer 136 may be disabled in this scenario, such that the stream application no longer incurs the overhead of determining maximum and/or estimated processing durations.

Although embodiments are described herein with reference to exemplary tuple processing durations, those skilled in the art will recognize that the techniques herein may be applied other finite resources, such as number of processor cycles used in tuple processing, amount of memory used in tuple processing, amount of storage capacity and/or bandwidth used during tuple processing, and amount of network bandwidth used during tuple processing. For example, in an alternative embodiment, the maximum amount of memory that a tuple is allowed to consume is thirty-two megabytes under a medium system load, sixteen megabytes under a high system load, and sixty-four megabytes under a low system load. In some embodiments, the stream pacer 136 imposes multiple constraints on each tuple, each constraint corresponding to a different resource. In such scenarios, the stream pacer 136 allows a tuple to execute only when all or a predefined number of the constraints are satisfied by the respective tuple.

Further, in one embodiment, the stream pacer 136 also evaluates tuples that are currently being processed, against the maximum allowed processing duration, to determine if the processing of any of the tuples should be halted. Although the stream pacer 136 may previously have allowed the tuples to be processed, the system load of the processing element 235 may since have increased to such an extent as to warrant halting the previously allowed tuples mid-processing. For example, suppose that the stream pacer 136 approves, for execution, a tuple estimated to take six seconds to execute, because the tuple does not exceed a maximum allowed processing duration of eight seconds. Suppose that three seconds after approving the tuple for execution, the stream pacer 136 determines a new maximum processing duration of two hundred milliseconds, as a result of a sudden increase in system load of the processing element 235. Because the remaining processing duration of the tuple (i.e., three seconds) exceeds the new maximum processing duration, the stream pacer 136 may halt the processing of the tuple. As described above, in some embodiments, it may not be desirable to halt the processing of tuples that are being processed. Accordingly, a user may set a flag that specifies not to halt processing tuples under any circumstances. Thus, the behavior of the stream pacer 136 in halting tuple processing may be overridden.

In some embodiments, rather than merely operating on a single tuple, the stream pacer 136 may also operate on a group of tuples. In such embodiments, the stream pacer 136 may approve or reject the entire group for processing, based on a comparison between a maximum duration for which a given processing element is allowed to process the group and an estimated duration for which the processing element is likely to process the group. Each group may be identified based on predefined criteria, such as based on the requesting entity, incoming tuple rates, windowing conditions, data attributes stored in the tuples, etc. Windowing conditions are a set of criteria which determine tuples within a specified group that are being operated on at a given time. For example, a time-based windowing condition for an associated processing operation may state that only tuples generated in the last ten seconds are considered to be within the scope of a window for the associated processing operation. The condition may be based on a number of factors, including but not limited to any specified time duration and/or tuple count, etc. At least some of the predefined criteria may be provided by the buffered stream monitor 245 associated with the processing element. Depending on the embodiment, the group of tuples may also span processing elements. In such embodiments, a single determination may be made of whether the group of tuples may be executed—regardless of which processing element is to execute each particular tuple in the group.

In some embodiments, instead of determining maximum and/or estimated durations relative to a single processing element 235, the stream pacer 136 may also determine maximum and/or estimated durations relative to a plurality of processing elements 235. The plurality of processing elements may correspond to a predefined section of the operator graph 132. In some embodiments, the plurality of processing elements may selected by a user. In other embodiments, the plurality of processing elements may be identified based on user-specified criteria, such as requesting entity, incoming tuple rates, windowing conditions, data attributes stored in the tuples, etc.

Figure 7:
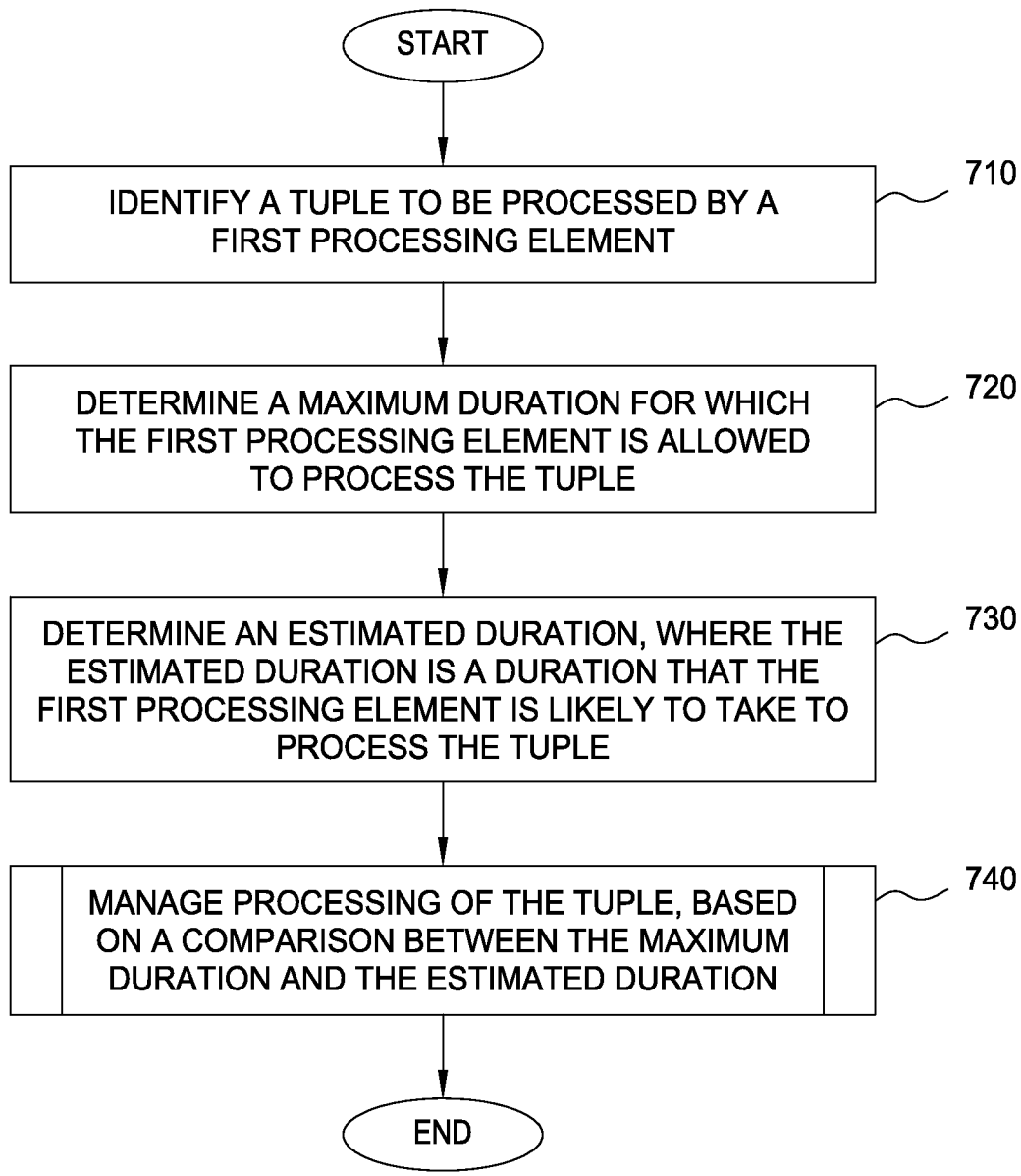
FIG. 7 is a flowchart depicting a method for evaluating a tuple for processing, according to one embodiment of the invention.

FIG. 7 is a flowchart depicting a method 700 for evaluating a tuple for processing, according to one embodiment of the invention. As shown, the method 700 begins at step 710, where the stream pacer 136 identifies a tuple from a requesting entity, for execution by a processing element. For example, the stream pacer 136 may identify the first tuple of FIG. 2C. At step 320, the stream pacer 136 determines a maximum duration for which the processing element is allowed to process the tuple. The maximum duration may be determined based on a measure of current load of the processing element, such as an indication of a current buffer level associated with the processing element. For instance, the stream pacer 136 may determine, based on a low buffer level, that the maximum processing duration should be eight hundred milliseconds.

At step 730, the stream pacer 136 determines an estimated duration, where the estimated duration refers to a duration for which the processing element is likely to process the tuple. For example, the stream pacer 136 may determine that the processing element is likely to take seven hundred milliseconds to process the tuple, as represented by the bar 602 in FIG. 6C. At step 740, the stream pacer 136 manages processing of the tuple, based on a comparison between the maximum duration and the estimated duration. The step 740 is further described below with reference to the method 800 of FIG. 8. After the step 740, the method 700 terminates.

Figure 8:
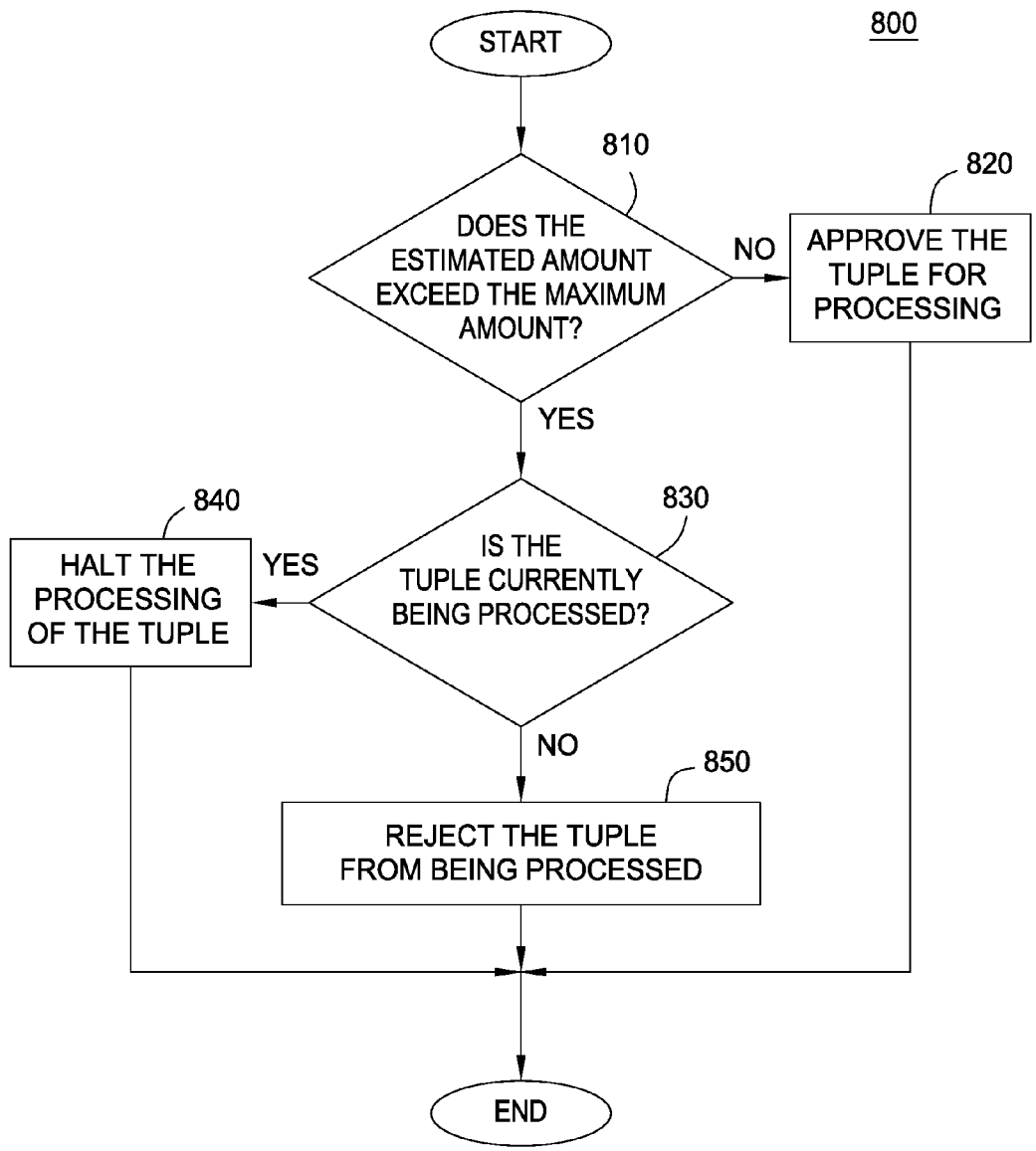
FIG. 8 is a flowchart depicting a method for managing processing of the tuple, according to one embodiment of the invention.

FIG. 8 is a flowchart depicting a method 800 for managing processing of the tuple, according to one embodiment of the invention. The method 800 corresponds to the step 740 of FIG. 7. As shown, the method 800 begins at step 810, where the stream pacer 136 determines whether the estimated duration exceeds the maximum duration, where the estimated and maximum durations are computed in steps 720 and 730 of FIG. 7, respectively. If the estimated duration does not exceed the maximum duration, then the stream pacer 136 allows the tuple to be processed by the processing element (step 820). On the other hand, if the estimated duration exceeds the maximum duration, then the stream pacer 136 determines whether the tuple is currently being processed (step 830). If so, then the stream pacer 136 may halt the processing of the tuple.

Alternatively, if the tuple is not currently being processed (step 830), then the stream pacer 136 may reject the tuple from being processed by the processing element (step 850). At least in some embodiments, the stream pacer 136 may also allow a different processing element to process the rejected tuple. Alternatively, the stream pacer 136 may delay processing of the tuple until the load experienced by the processing element is reassessed, by which point the load may have become light enough as to allow execution of the tuple by the processing element. At least in some embodiments, the stream pacer 136 assesses the load according to a predefined schedule. For example, the load may be assessed in five-minute intervals. A user may tailor the schedule to suit the needs of a particular case. The stream pacer 136 may also return a message to a requesting entity, explaining that execution of the tuple is denied and/or delayed. After the step 820, the step 840, or the step 850, the method 800 terminates.

Advantageously, embodiments of the invention provide techniques for evaluating a tuple for processing. One embodiment provides a stream pacer that is configured to identify a tuple to be processed by a processing element in a steam application. The stream pacer determines a maximum duration for which the processing element is allowed to process the tuple. The stream pacer also determines an estimated duration for which the processing element is likely to process the tuple. The stream pacer then manages processing of the tuple, based on a comparison between the maximum duration and the estimated duration. Advantageously, the stream pacer may manage tuple processing in a manner that is more responsive to the needs of processing elements in and/or users of the stream application.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
receiving streaming data to be processed by a stream application comprising a plurality of processing elements, wherein each processing element includes one or more operators that are contained within a single process, each operator having executable code configured to connect to one or more other operators, and wherein the streaming data includes a plurality of tuples to be processed by different processing elements of the stream application, each tuple having one or more attributes;
providing an operator graph of processing elements, the operator graph defining at least one execution path for processing the received streaming data, at least a first processing element of the operator graph configured to receive data from at least one upstream processing element and transmit data to at least one downstream processing element;
identifying at least one tuple to be processed by at least one processing element of the stream application;
determining a maximum duration for which the at least one processing element is allowed to process the at least one tuple;
determining an estimated duration for which the at least one processing element is likely to process the at least one tuple; and
managing processing of the at least one tuple, based on a comparison between the maximum duration and the estimated duration and by operation of one or more computer processors.

2. The computer-implemented method of claim 1, wherein the maximum duration is determined based on at least one of user input and a workload experienced by the at least one processing element.

3. The computer-implemented method of claim 1, wherein the estimated duration is determined based on historical usage data collected from tuples previously processed by the at least one processing element.

4. The computer-implemented method of claim 1, wherein managing execution of the at least one tuple comprises:
approving the at least one tuple to be processed by the at least one processing element, upon determining that the estimated duration does not exceed the maximum duration.

5. The computer-implemented method of claim 1, wherein the at least one processing element includes a first processing element, and wherein managing processing of the at least one tuple comprises, upon determining that the estimated duration exceeds the maximum duration, at least one of:
rejecting the at least one tuple from being processed by the first processing element; and
approving the at least one tuple to be processed by a second processing element of the stream application.

6. The computer-implemented method of claim 1, wherein the method further comprises approving the at least one tuple for processing by the at least one processing element, and wherein managing processing of the at least one tuple further comprises:
halting the processing of the at least one tuple by the at least one processing element, upon determining that the estimated duration exceeds the maximum duration.

7. The computer-implemented method of claim 1, wherein the maximum duration is determined based on at least one of user input and a workload experienced by the at least one processing element.

8. The computer-implemented method of claim 7, wherein the estimated duration is determined based on historical usage data collected from tuples previously processed by the at least one processing element.

9. The computer-implemented method of claim 8, wherein managing execution of the at least one tuple comprises:
approving the at least one tuple to be processed by the at least one processing element, upon determining that the estimated duration does not exceed the maximum duration.

10. The computer-implemented method of claim 9, wherein the at least one processing element includes a first processing element, and wherein managing processing of the at least one tuple comprises, upon determining that the estimated duration exceeds the maximum duration, at least one of:
rejecting the at least one tuple from being processed by the first processing element; and
approving the at least one tuple to be processed by a second processing element of the stream application.

11. The computer-implemented method of claim 10, wherein the at least one processing element includes a first processing element, wherein managing processing of the at least one tuple in a first instance comprises, upon determining that the estimated duration exceeds the maximum duration, rejecting the at least one tuple from being processed by the first processing element.

12. The computer-implemented method of claim 11, wherein managing processing of the at least one tuple in a second instance comprises, upon determining that the estimated duration exceeds the maximum duration, approving the at least one tuple to be processed by a second processing element of the stream application.

13. The computer-implemented method of claim 12, wherein managing processing of the at least one tuple in a third instance comprises, upon determining that the estimated duration exceeds the maximum duration:
rejecting the at least one tuple from being processed by the first processing element; and
approving the at least one tuple to be processed by a second processing element of the stream application.

14. The computer-implemented method of claim 13, wherein operator graph of processing elements is provided by a management application different from the stream application.

15. The computer-implemented method of claim 14, wherein the management application includes a stream manager component and a stream pacer component.

16. The computer-implemented method of claim 15, wherein the stream manager component is configured to:
monitor the stream application running; and
modify one or more properties of the operator graph of processing elements.

17. The computer-implemented method of claim 16, wherein the stream manager component is configured to, in respective instances, modify the one or more properties of the operator graph of processing elements by:
moving a processing element from a first compute node to a second compute node of a plurality of compute nodes executing the processing elements, in order to manage processing loads of the plurality of compute nodes; and
modifying data tuples flowing to the processing elements executing on the plurality of compute nodes.

18. The computer-implemented method of claim 17, wherein the stream manager component is further configured to, in respective instances, modify the one or more properties of the operator graph of processing elements by:
inserting a processing element to the plurality of compute nodes; and removing a processing element from the plurality of compute nodes.

19. The computer-implemented method of claim 18, wherein the stream manager component is further configured to, in respective instances, modify the one or more properties of the operator graph of processing elements by:
   fusing two processing elements executing on the plurality of compute nodes; and
   un-fusing a fused processing element executing on the plurality of compute nodes.

20. The computer-implemented method of claim 19, wherein the stream pacer component is configured to manage processing of a data stream comprising the at least one tuple.

* * * * *